United States Patent
Santini

(10) Patent No.: US 6,722,018 B2
(45) Date of Patent: Apr. 20, 2004

(54) METHOD OF FORMING A SECOND POLE PIECE OF A WRITE HEAD

(75) Inventor: Hugo Alberto Emilio Santini, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 186 days.

(21) Appl. No.: 09/884,820

(22) Filed: Jun. 18, 2001

(65) Prior Publication Data

US 2002/0191351 A1 Dec. 19, 2002

(51) Int. Cl.[7] .............................. G11B 5/193; B05D 1/32
(52) U.S. Cl. ................................ 29/603.12; 29/603.13; 29/603.14; 29/603.15; 29/603.16; 29/603.18; 427/127; 427/131; 427/282; 216/22; 216/52; 360/122; 360/125
(58) Field of Search .................... 29/603.07, 603.08, 29/603.11, 603.12, 603.13, 603.14, 603.15, 603.16, 603.18; 427/127, 128, 131, 132, 282, 443.1; 216/22, 52; 360/122, 125, 235.4

(56) References Cited

U.S. PATENT DOCUMENTS 5,639,509 A * 6/1997 Schemmel ................... 427/130
5,652,687 A * 7/1997 Chen et al. ............. 360/122 X
5,863,448 A * 1/1999 Otani et al. .................... 216/22
6,073,338 A * 6/2000 Liu et al. ................. 29/603.14

FOREIGN PATENT DOCUMENTS

JP          9-153204      *   6/1997

* cited by examiner

Primary Examiner—A. Dexter Tugbang
(74) Attorney, Agent, or Firm—Ervin F. Johnston

(57) ABSTRACT

A method of making a magnetic write head includes forming a strip of negative photoresist on a wafer at an ABS site with a width that defines a track width of the write head and which has a height above a desired height of a second pole tip. An alumina layer is formed on the wafer and on the strip with a thickness above the wafer that is equal to or greater than a desired height of the second pole tip. The alumina layer is then mechanically polished until the negative photoresist strip is exposed. The negative photoresist strip is then removed leaving an opening in the alumina layer after which the second pole tip is formed in the opening. In a first embodiment of the invention the second pole tip and the second pole piece yoke are one piece and are planar and in a second embodiment of the invention a P2 yoke is stitched to the second pole tip. In both embodiments the first pole piece of the write head can be notched without damaging the second pole tip.

17 Claims, 14 Drawing Sheets

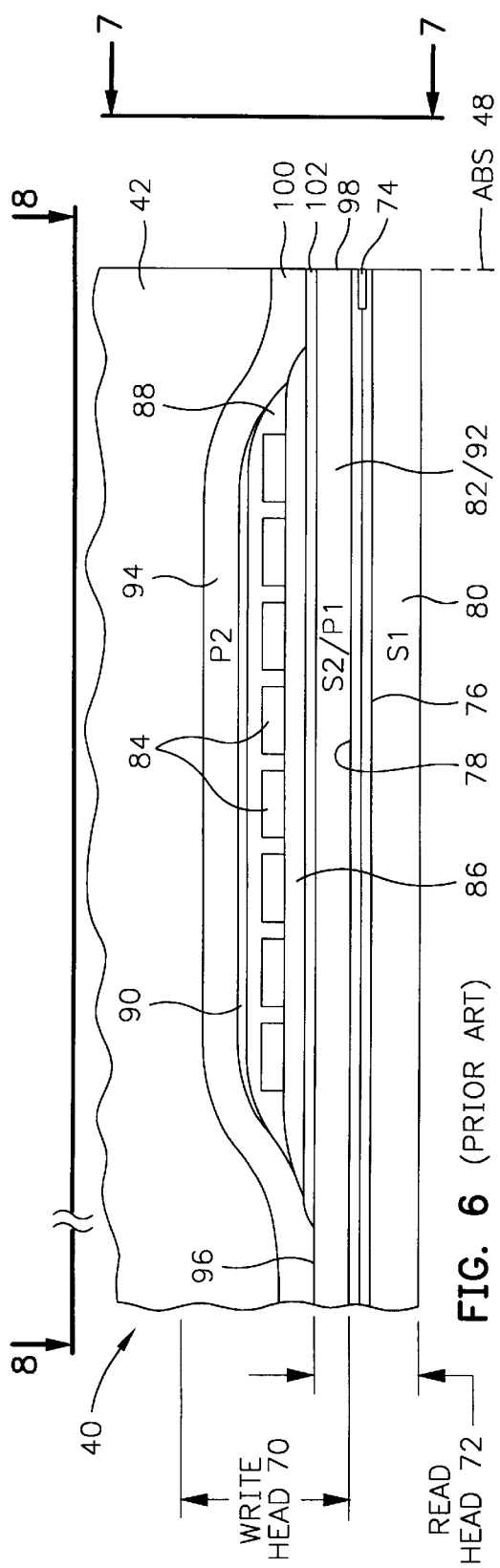
FIG. 6 (PRIOR ART)
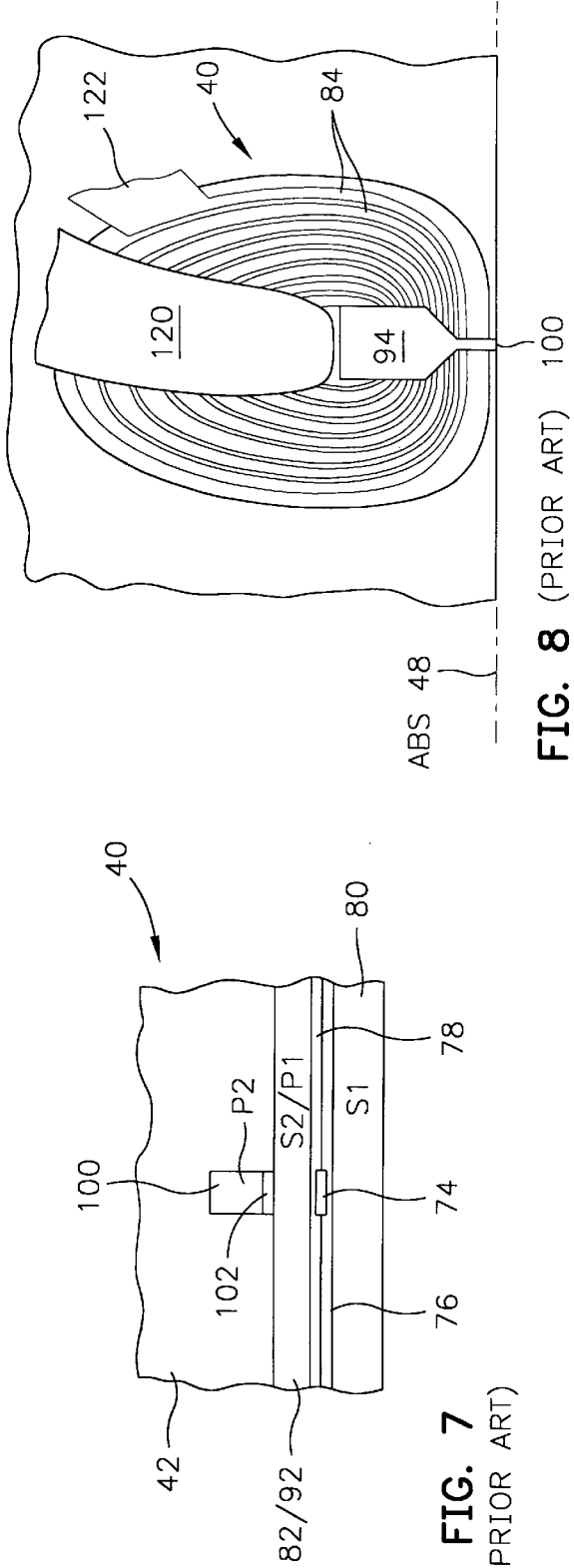
FIG. 8 (PRIOR ART)
FIG. 7 (PRIOR ART)

METHOD OF FORMING A SECOND POLE PIECE OF A WRITE HEAD

BACKGROUND OF THE INVENTION

1. Field of the Invention

The present invention relates to a second pole piece of a write head fabricated by high aspect ratio lithography and image transfer and, more particularly, to a highly defined second pole tip which is defined by a high aspect ratio negative photoresist strip wherein the image of the negative photoresist strip is transferred to an alumina frame for forming the second pole tip during a plating step.

2. Description of the Related Art

The heart of a computer is a magnetic disk drive which includes a rotating magnetic disk, a slider that has read and write heads a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The track width density of a write head is quantified as tracks per inch (TPI) along a radius of a rotating magnetic disk which is determined by the width of the second pole tip. The second pole tip is part of a second pole piece of the write head and is exposed at the ABS. If the second pole tip is made more narrow the storage capacity of the magnetic disk drive is increased. Efforts along this line, as well as increasing the number of bits written into the track along its length, have resulted in increasing the storage capacity of computers from kilobytes to megabytes to many gigabytes. The desire now is to fabricate second pole tips with submicron widths, which effort is limited by present fabrication techniques. The second pole tip is typically fabricated with a positive photoresist frame which has an opening where the second pole tip is to be formed. The resolution of the framing step for the second pole tip can be improved as will be discussed in the Summary of the Invention.

In order to mimimize side writing between the second pole tip and a first pole tip of the write head, it is desirable to notch the first pole tip on each side of the second pole tip so that the first pole tip has first and second side walls which align with first and second side walls respectively of the second pole tip. With this arrangement flux will be transferred between the first and second pole tips without extending side-wise beyond the first and second side walls of the first pole tip. Side writing expands the width of a track and reduces the track width density capability of the write head or, alternatively, write signals stray into adjacent tracks which degrades the signal performance of the rotating disk when the tracks are read by the read head. Typically, the first pole tip is notched by ion milling employing the second pole tip as a mask; This processing is detrimental to the second pole tip since the ion milling alters the height of the second pole tip as well as altering the composition and width of the second pole tip. Since the second pole tip is the last one of the first and second pole tips to pass by the rotating magnetic disk its resolution is extremely important for improving track width density of the write head.

SUMMARY OF THE INVENTION

In the present invention a strip of negative photoresist is formed on a wafer at an ABS site of the ABS with a width that defines a track width of a second pole tip and with a height which is above a desired height of the second pole tip. An alumina layer is then formed on the wafer and on the strip with a thickness above the wafer that is equal to or greater than a desired height of the second pole tip. The alumina layer is then chemically mechanically polished (CMP) until the negative photoresist strip is exposed. The negative photoresist strip is then removed leaving an opening for the second pole tip in the alumina layer. Employing the alumina layer as a frame the second pole tip is then plated in the opening. It has been found that the negative photoresist improves the aspect ratio of the lithography. The aspect ratio is the ratio of the width of the defining photoresist to its height. The aspect ratio of the aforementioned positive photoresist frame is the width of the opening in the positive photoresist to the height of the opening whereas the aspect ratio of the negative photoresist strip is the ratio of the width of the strip to its height. The resolution of the space in a positive photoresist frame is less than the resolution of the negative photoresist strip. For example, in order to produce a 0.6 $\mu$m space in positive photoresist a 0.45 $\mu$m mask opening would be employed during the light imaging step whereas in order to produce a 0.6 $\mu$m negative resist strip it would be necessary to employ a 0.75 $\mu$m mask during the light imaging step. The larger mask dimension is easier to make and the sigma (standard deviation) or windage is proportionately smaller.

While the photoresist strip can be fabricated from positive photoresist it is preferred that it be fabricated from negative photoresist. A negative photoresist strip has a greater structural integrity than a positive photoresist strip and can therefore be narrower, for increasing the TPI, and higher for fabricating a second pole tip with sufficient volume for carrying the required amount of flux. The high structural integrity of the negative photoresist strip is highly beneficial for constructing first and second notches in the first pole tip by ion milling. Instead of employing the second pole tip as a mask for constructing these notches the negative photoresist strip serves as the mask, thus preventing damage to the second pole tip.

In a preferred embodiment of the invention the first pole piece layer is provided with a first pole piece (P1) pedestal which extends upwardly from the first pole piece to a height greater than a write coil and the insulation thereon. The write coil layer is fabricated on an insulation layer which is on the first pole piece layer and an alumina layer is deposited on the entire wafer. The alumina layer is then chemically mechanically polished leaving some of the alumina insulation above the write coil layer and until a top surface of the P1 pedestal is exposed. A write gap layer is then deposited and a negative photoresist layer is deposited on the write gap layer. The negative photoresist layer is then light imaged and developed to provide two small openings at an ABS site with the openings being spaced apart by the desired negative photoresist strip width. The P1 pedestal can then be notched through the openings in the negative photoresist so that side edges of the notches line up with side edges of the negative photoresist strip. Alumina may then be deposited on the wafer with a thickness greater than the desired height of the second pole tip and chemically mechanically polished until the alumina is removed, except for first and 5 second alumina pedestals in the negative photoresist openings. The negative photoresist is then removed leaving a desired opening between first and second alumina pedestals for the fabrication of the second pole tip. A positive photoresist frame is then constructed for the second pole piece (P2) yoke after which the P2 tip and the P2 yoke are simultaneously plated between and back of the first and second alumina pedestals.

An object of the present invention is to fabricate a second pole tip of a write head with improved resolution.

Another object is to notch a first pole tip without damaging the second pole tip, especially when the second pole tip has a submicron track width.

A further object is to provide first and second embodiments of a write head which are fabricated by methods of the present invention.

Other objects and attendant advantages of the invention will be appreciated upon reading the following description taken together with the accompanying drawings.

BRIEF DESCRIPTION OF THE DRAWINGS

FIG. 6 is a partial view of the slider and a prior art merged magnetic head as seen in plane 6—6 of FIG. 2;

FIG. 7 is a partial ABS view of the slider taken along plane 7—7 of FIG. 7 to show prior art read and write elements of the merged magnetic head;

FIG. 8 is a view taken along plane 8—8 of FIG. 6 with all material above the coil layer and leads removed;

FIG. 11 B is an ABS illustration of FIG. 11;

DESCRIPTION OF THE PREFERRED EMBODIMENTS

Magnetic Disk Drive

Figure 1:
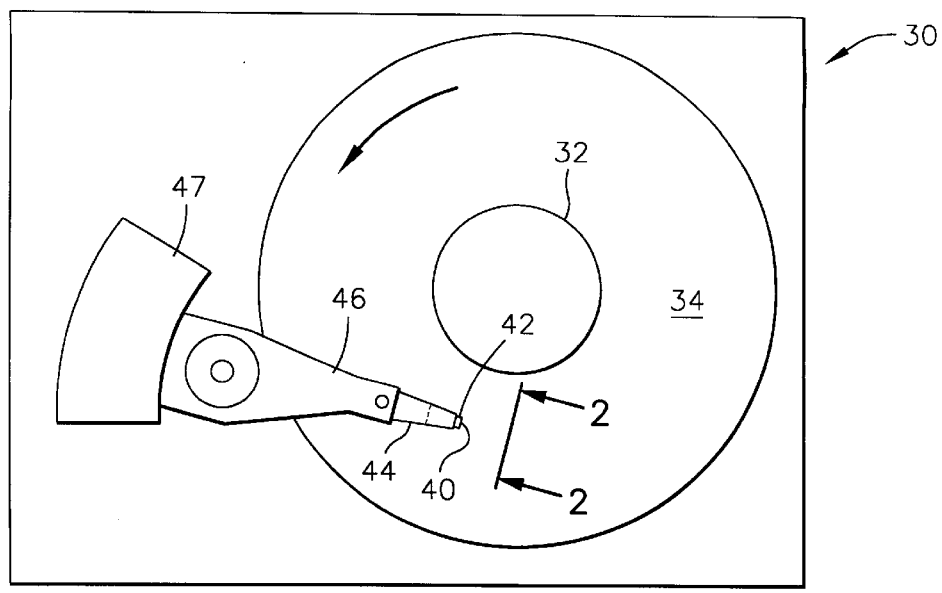
FIG. 1 is a plan view of an exemplary prior art magnetic disk drive.
Figure 2:
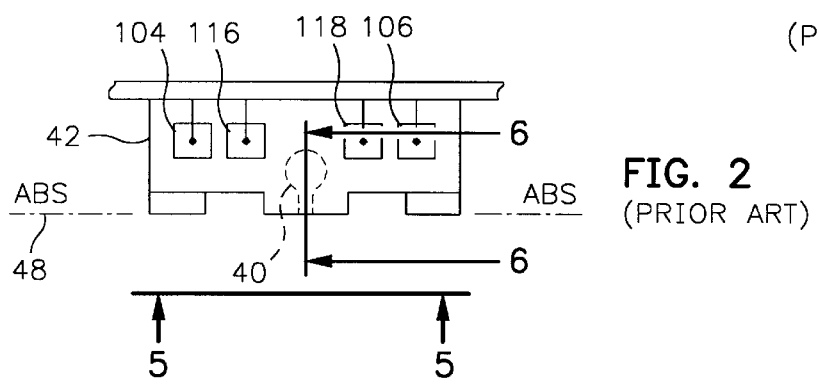
FIG. 2 is an end view of a prior art slider with a magnetic head of the disk drive as seen in plane 2—2 of FIG. 1.
Figure 3:
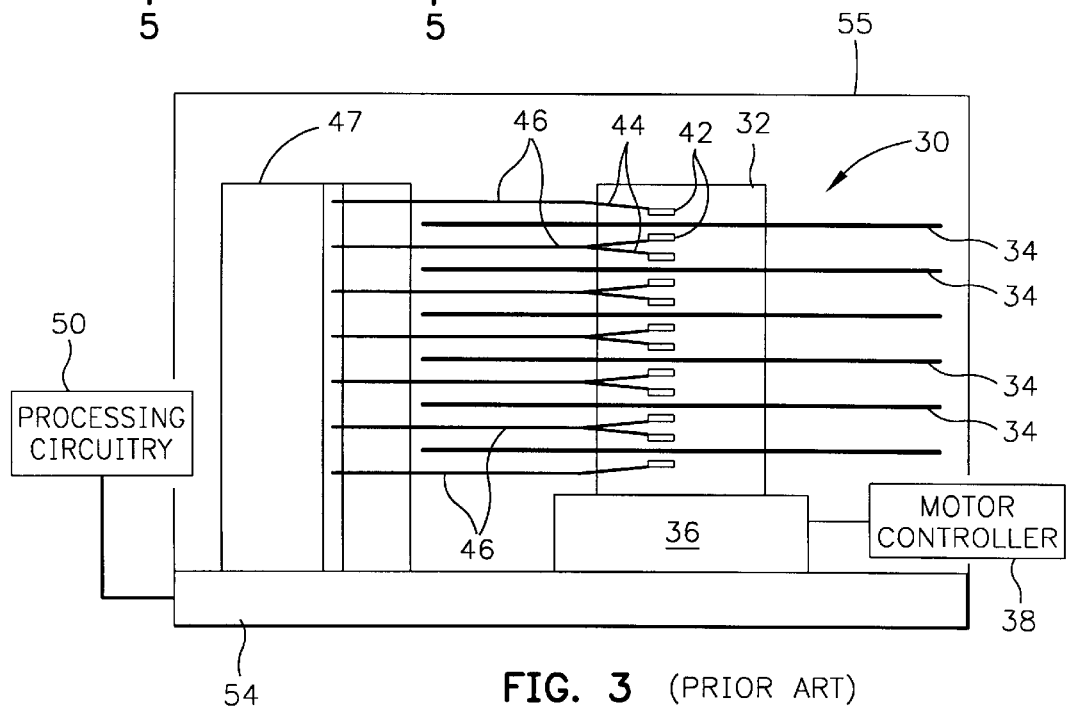
FIG. 3 is an elevation view of the prior art magnetic disk drive wherein multiple disks and magnetic heads are employed.
Figure 4:
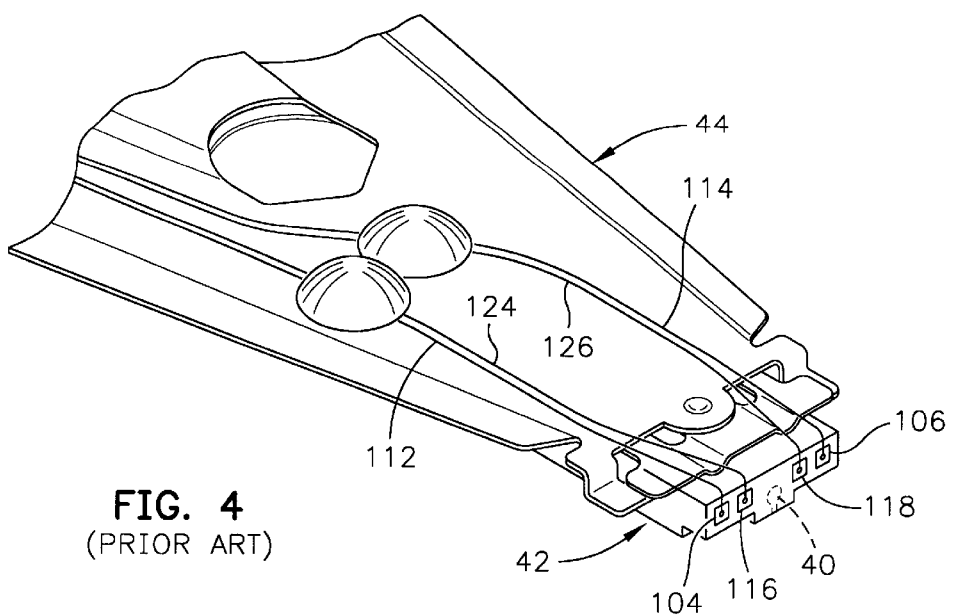
FIG. 4 is an isometric illustration of an exemplary prior art suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
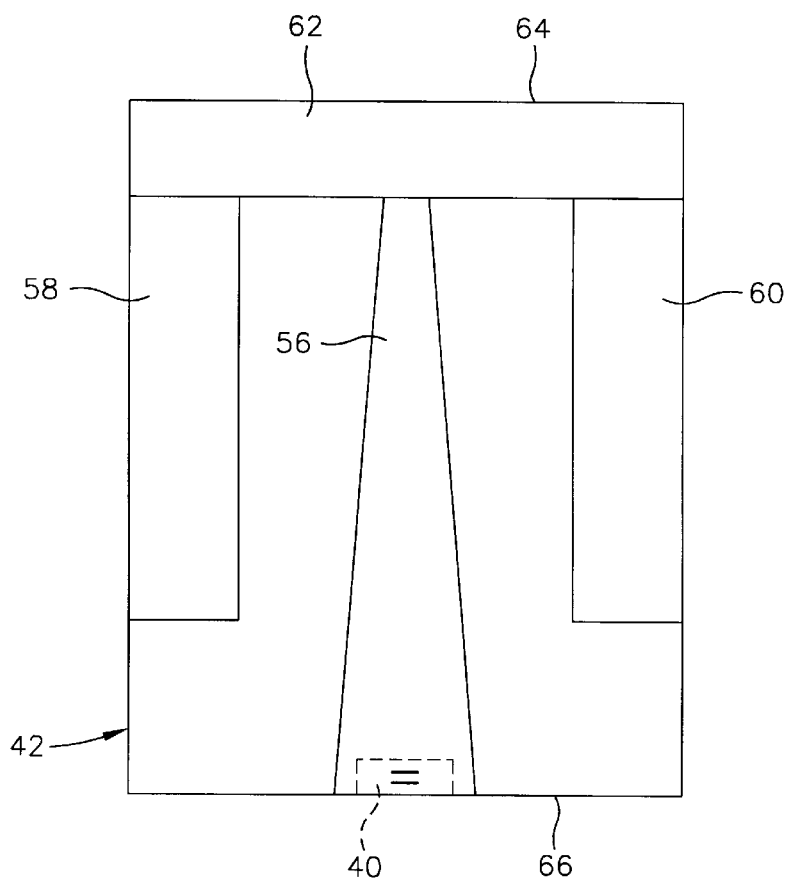
FIG. 5 is an ABS view of the prior art magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a merged magnetic head 40, which includes a write head portion 70 and a read head portion 72, the read head portion employing a sensor 74. FIG. 7 is an ABS view of FIG. 6. The sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the sensor 74 changes. A sense current Is conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole pieces 92 and 94 wherein the second shield layer 82 functions as the first pole piece during a write function. In a piggyback head the second shield layer 82 and the first pole piece are separate layers which are separated by an insulation layer. The first and second pole pieces 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the sensor 74 to leads 112 and 114 on the suspension 44, and third and fourth solder connections 116 and 118 connect leads 120 and 122 from the coil 84 (see FIG. 8) to leads 124 and 126 on the suspension.

The Invention

Figure 9:
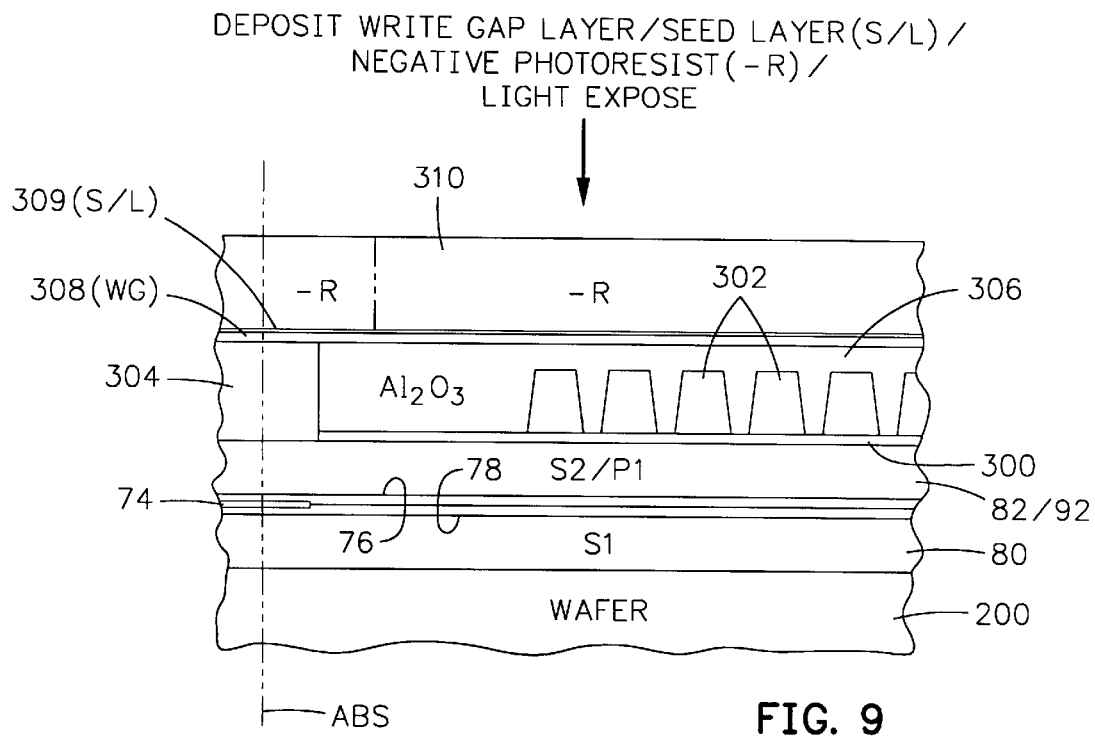
FIG. 9 is a side view of a partially completed write head similar to the illustration shown in FIG. 6 except a P1 pedestal, a write coil layer seed layer and an alumina layer have been formed with the tops of the P1 pedestal and the alumina layer planarized and a negative photoresist layer has been formed and light exposed.

FIGS. 9–17 illustrate a preferred embodiment of the present invention. FIG. 9 is similar to FIG. 6 in that the sensor 74, the first and second read gap layers 76 and 78 and the first and second shield layers 80 and 82 are formed on a wafer 200. An insulation layer 300, which may be alumina, is then formed on the second shield/first pole piece layer 82/92. A write coil layer 302 is then formed on the insulation layer 300 and a front portion of the insulation layer is removed so as to expose a front portion of the second shield/first pole piece layer 82/92. A first pole piece (P1) pedestal 304 is then fabricated on the exposed portion of the second shield/first pole piece layer 82/92 with a height which may be greater than the thickness of the write coil 302. An alumina layer 306 is then deposited over the entire wafer covering the top of the write coil 302 and the top of the P1 pedestal 304. The wafer is then chemically mechanically polished until the top surface of the P1 pedestal is exposed. This optionally leaves the top of the write coil layer 302 covered with alumina which, in combination with the alumina between the coils and the bottom insulation layer 300, provides the insulation stack for the write head. Next, a write gap layer (WG) 308 and a seed layer (S/L) 309 are formed on the top surface of the P1 pedestal 304 and the top of the alumina layer 306. Next, a negative photoresist layer (−R) 310 is formed on the seed layer 309 and is light-exposed through a mask (not shown) at desired first and second openings, which will be discussed hereinafter.

Figure 10:
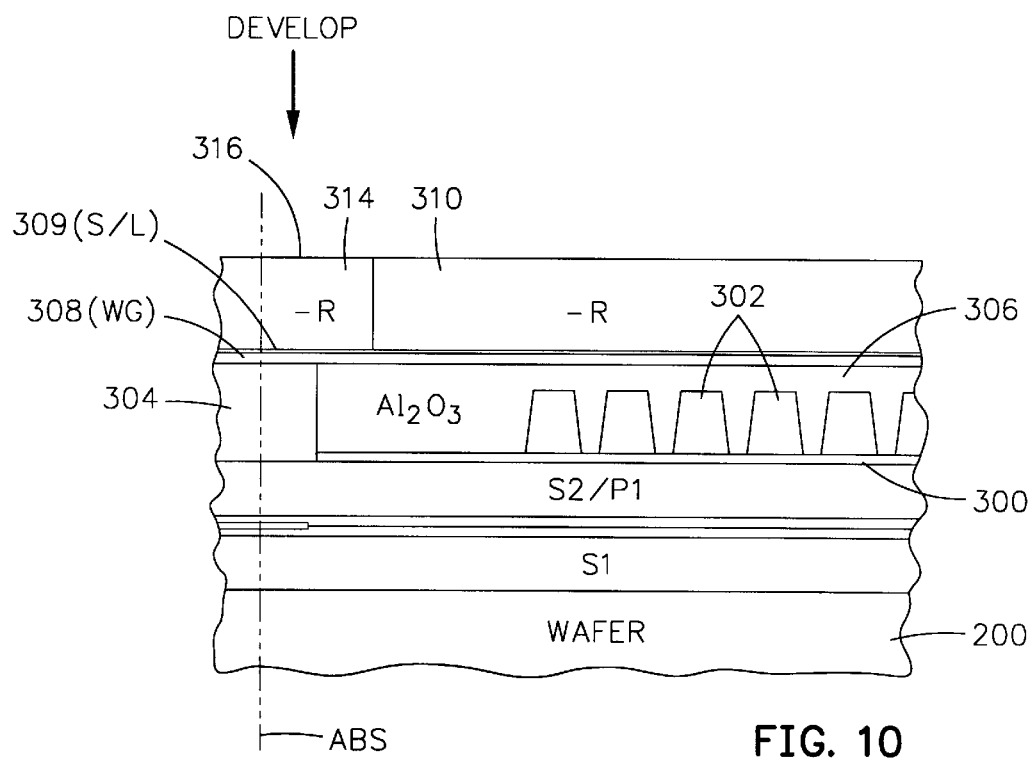
FIG. 10, which is a section 10—10 through FIG. 10A, is similar to FIG. 9 except the negative photoresist has been developed.
Figure 10A:
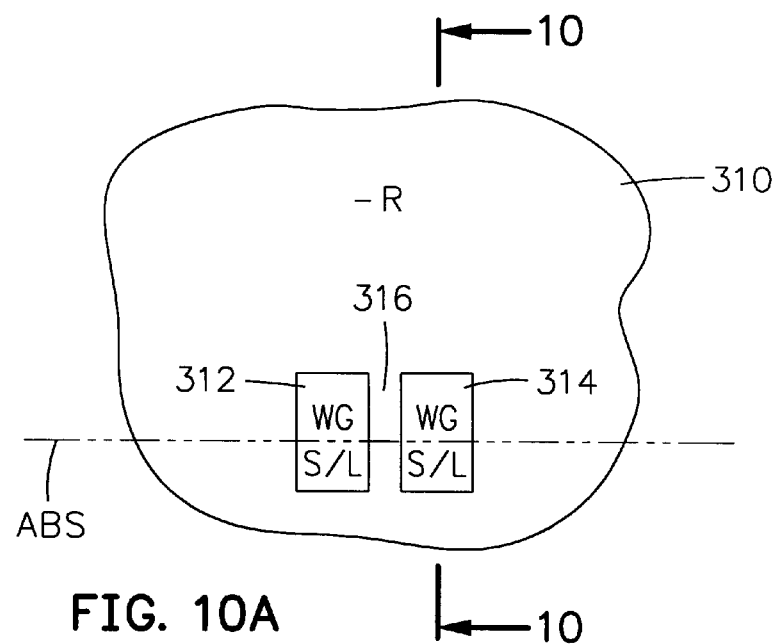
FIG. 10A is a top view of FIG. 10.
Figure 10B:
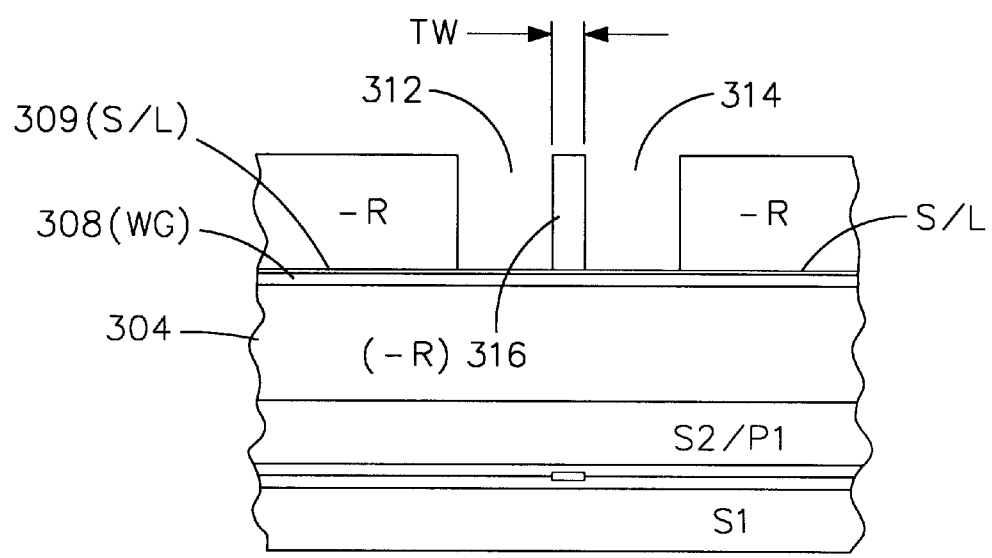
FIG. 10B is an ABS illustration of FIG. 10.

In FIG. 10 the negative photoresist 310 is developed which provides the negative resist layer with first and second openings 312 and 314, as shown in FIGS. 10A and 10B. Each of these openings exposes the write gap layer (WG) and the seed layer (S/L). The openings 312 and 314 leave a negative photoresist strip (−R) 316 therebetween which has a width equal to the desired track width (TW) of a second pole piece pole tip (P2), which will be described hereinafter. As discussed hereinabove, the negative photoresist strip 316 has high structural integrity for subsequent processing steps.

Figure 11:
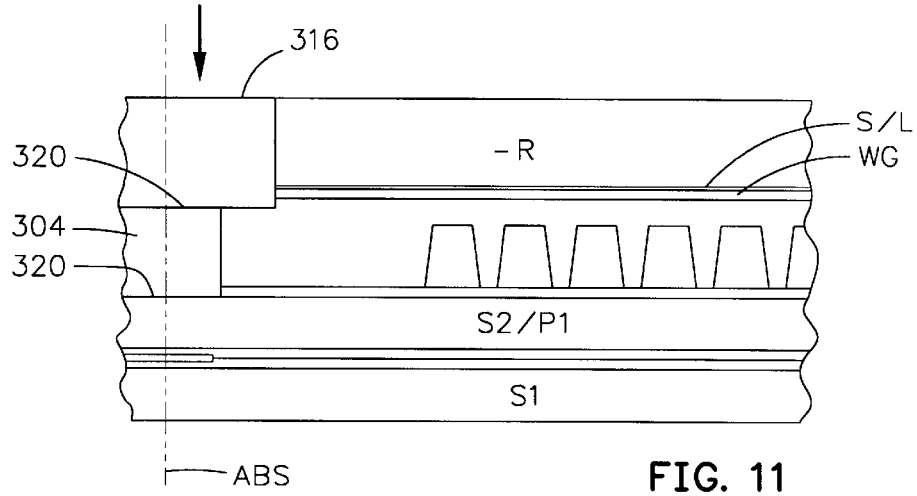
FIG. 11, which is a section 11—11 through FIG. 11A, is the same as FIG. 10 except ion milling is implemented to remove portions of the write gap and seed layers and form notches in the first pole piece layer.
Figure 11A:
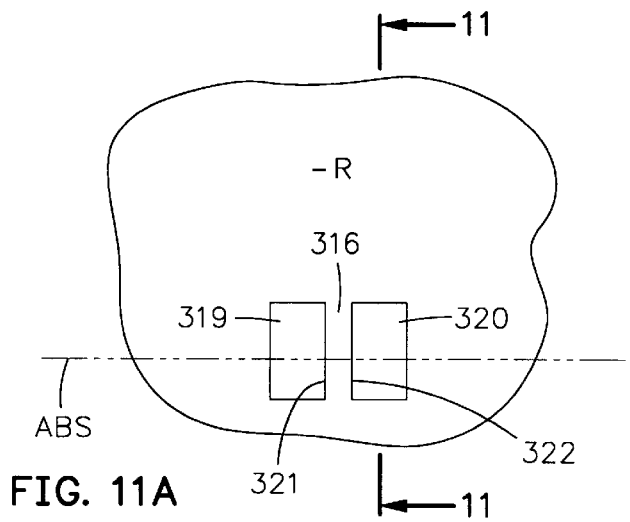
FIG. 11A is a top view of FIG. 11.
Figure 11B:
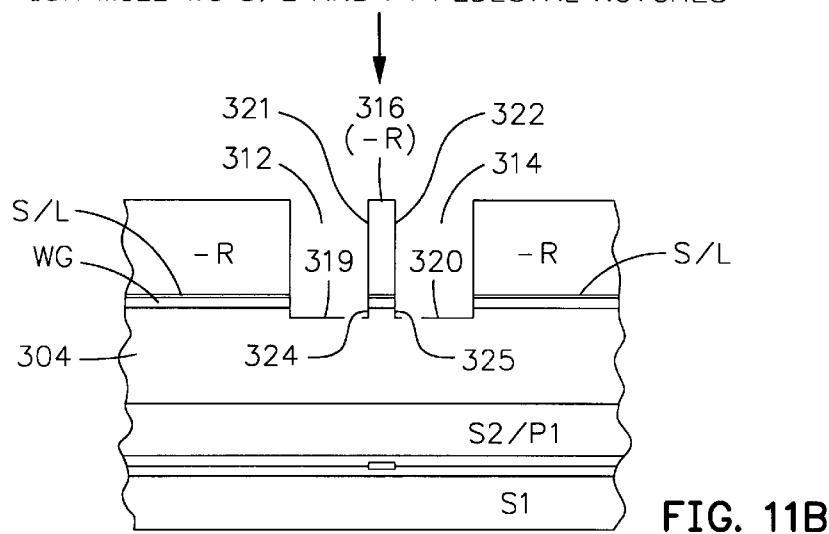

In FIG. 11 ion milling is implemented to mill away the write gap and seed layer portions within the first and second openings 312 and 314 and provide the P1 pedestal 304 with first and second notches 319 and 320, as shown in FIGS. 11 and 11B. This aligns first and second sides 321 and 322 of the negative photoresist strip 316 with first and second sides 324 and 325 respectively of the P1 pedestal. This nothing is desirable to minimize side writing and is therefore the preferred embodiment of the present invention. However, in a broad concept of the invention this is optional and is not shown in the subsequent figures of the second embodiment.

Figure 12:
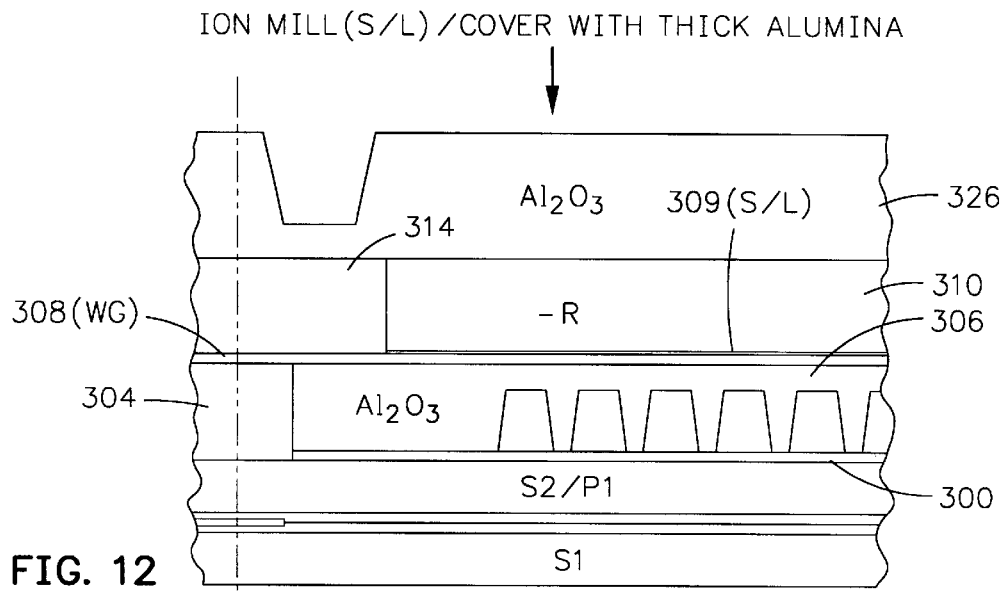
FIG. 12, which is a section 12—12 through FIG. 12A, is the same as FIG. 11 except an alumina layer has been deposited.
Figure 12A:
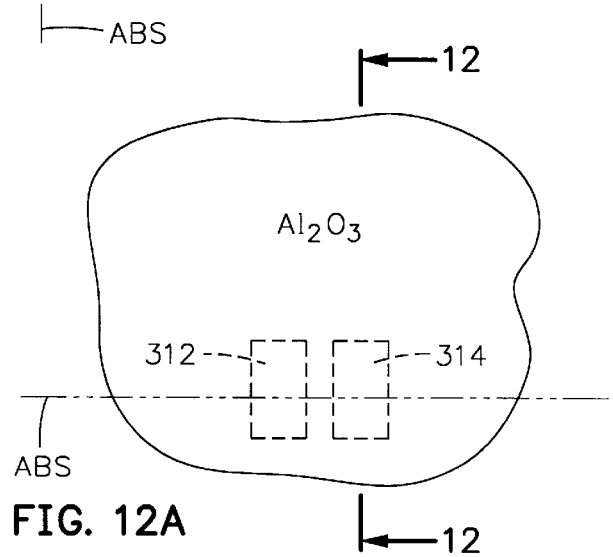
FIG. 12A is a top view of FIG. 12.
Figure 12B:
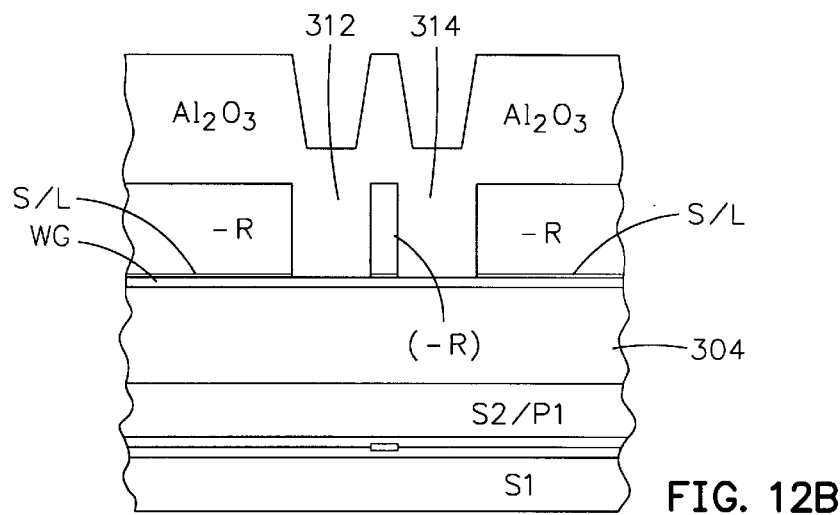
FIG. 12B is an ABS illustration of FIG. 12.
Figure 13:
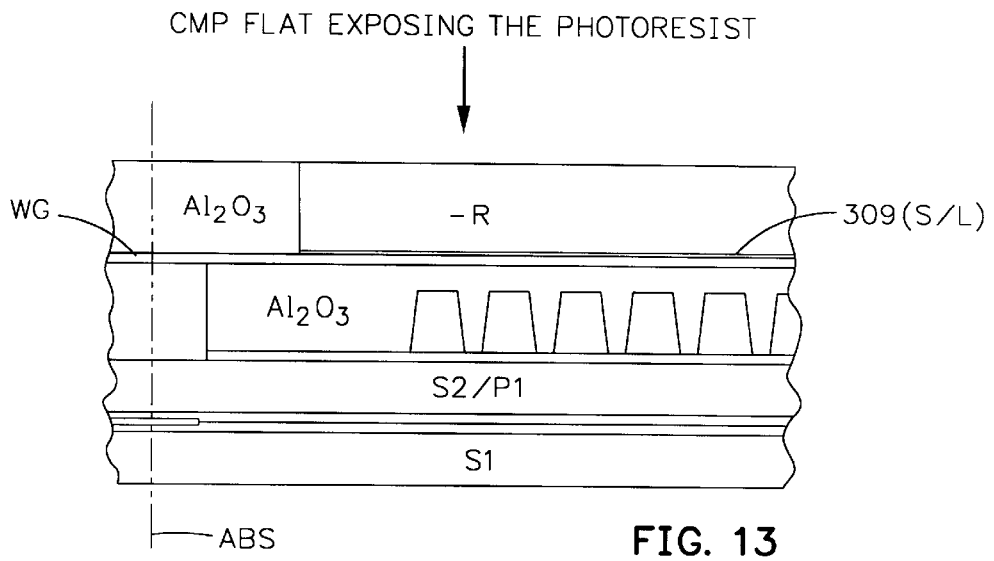
FIG. 13, which is a section 13—13 through FIG. 13A, is the same as FIG. 12 except the alumina layer has been chemically mechanically polished.
Figure 13A:
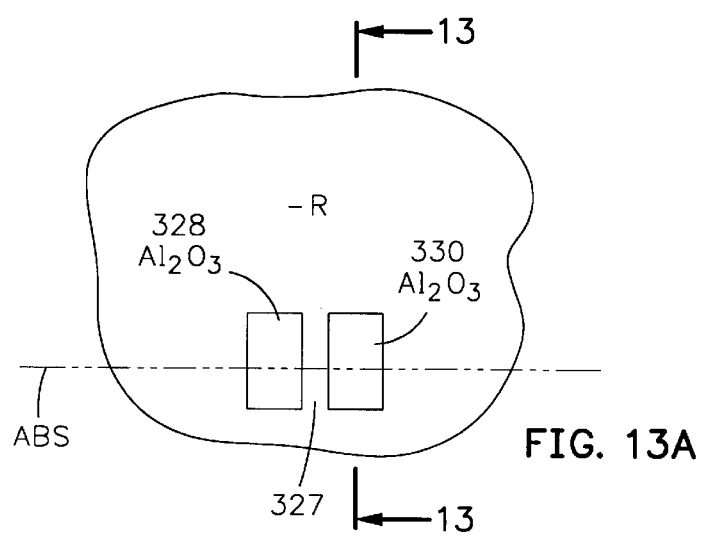
FIG. 13A is a top view of FIG. 13.
Figure 13B:
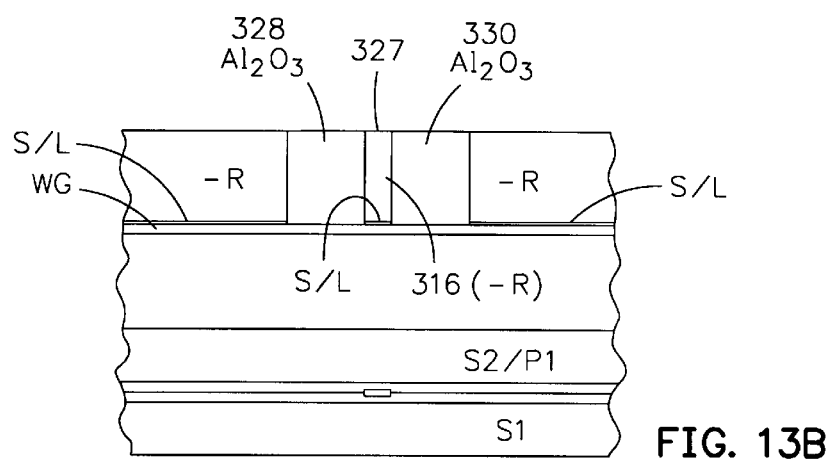
FIG. 13B is an, ABS illustration of FIG. 13.
Figure 14:
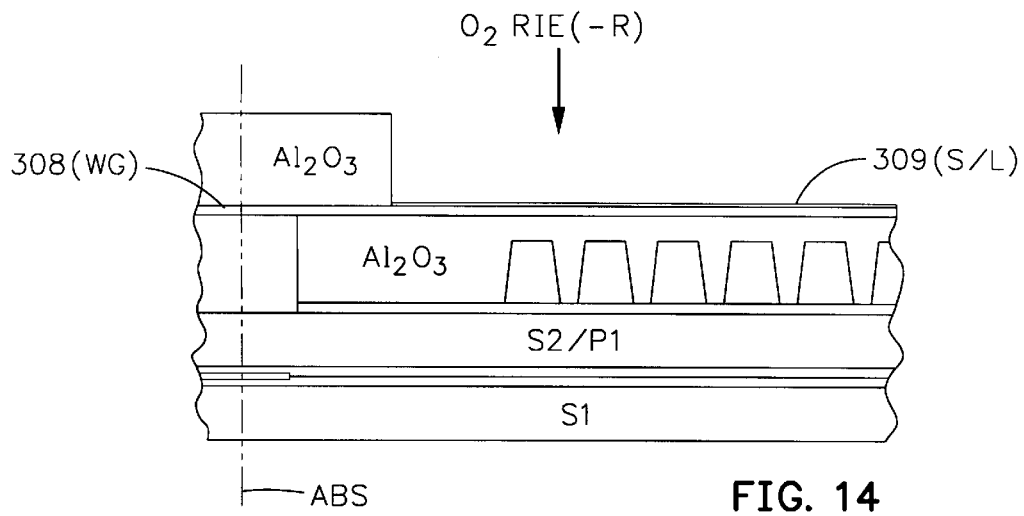
FIG. 14, which is a section 14—14 through FIG. 14A, is the same as FIG. 13 except the negative photoresist layer has been removed.
Figure 14A:
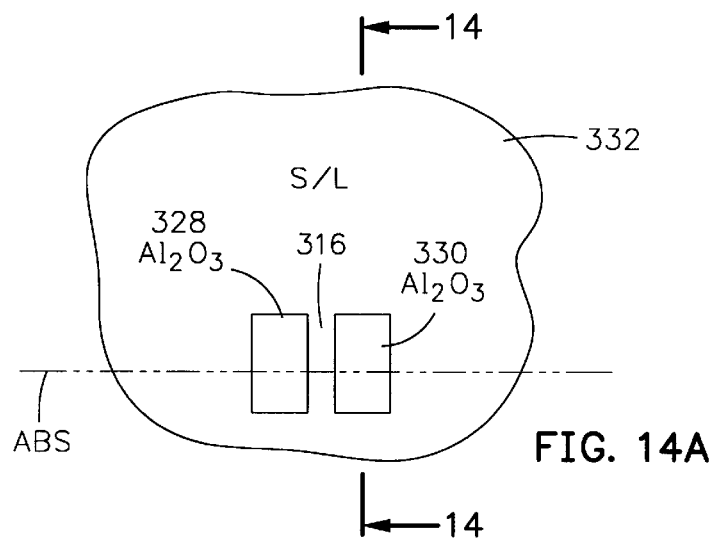
FIG. 14A is a top view of FIG. 14.
Figure 14B:
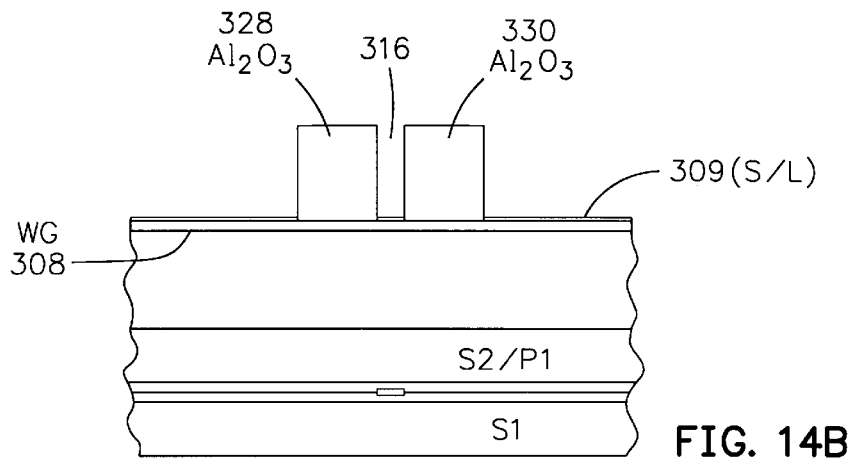
FIG. 14B is an ABS illustration of FIG. 14.

In FIG. 12 the seed layer 309 is milled away in the openings 312 and 314 and an alumina layer 326 is deposited over the entire wafer on top of the photoresist layer 310 with a thickness greater than the photoresist layer so as to fill in the first and second openings 312 and 314 with an excess of alumina thereabove as shown in FIGS. 12 and 12B. Next, the alumina layer is chemically mechanically polished flat exposing a top surface 327 of the negative photoresist strip and the remainder of the negative photoresist layer as shown in FIGS. 13, 13A and 13B. This leaves first and second alumina pedestals 328 and 330 which are surrounded by negative photoresist (—R) as shown in FIG. 13A. Oxygen-based reactive ion etching ($O_2$ RIE) is then implemented to remove the negative photoresist, as shown in FIGS. 14, 14A and 14B, leaving the first and second alumina pedestals 328 and 330 freestanding.

Figure 15:
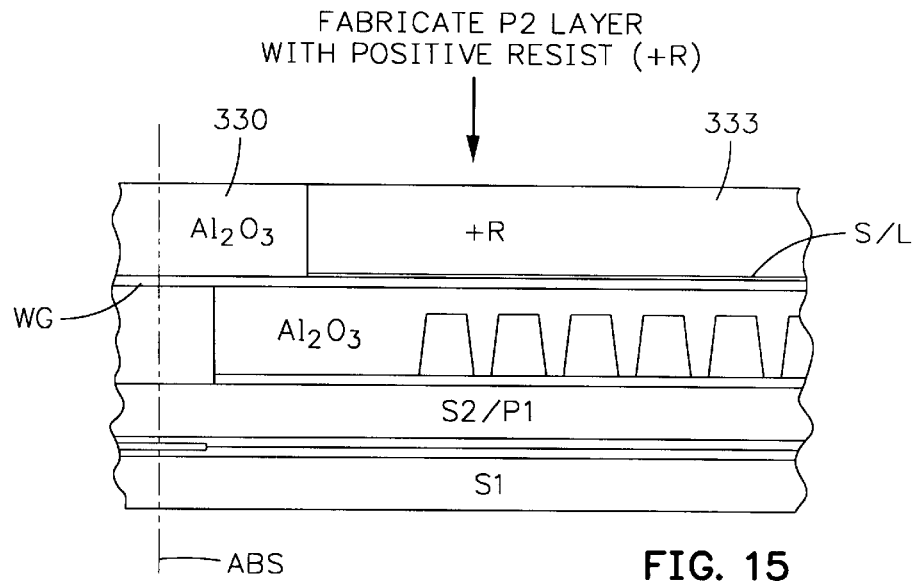
FIG. 15, which is a section 15—15 of FIG. 15A, is the same as FIG. 14 except a positive photoresist frame has been made for fabricating the P2 yoke.
Figure 15A:
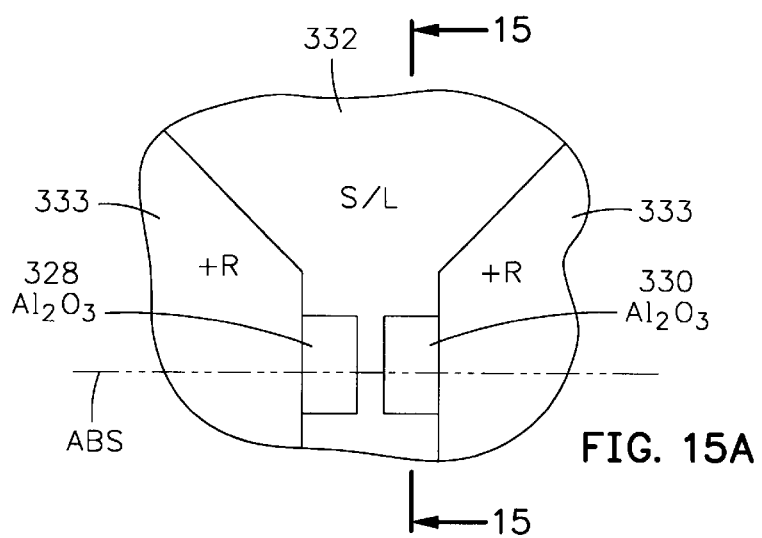
FIG. 15A is a top view of FIG. 15.
Figure 15B:
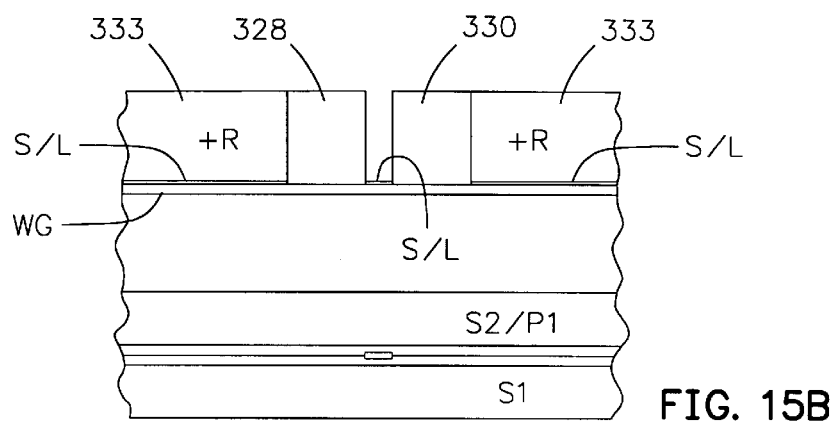
FIG. 15B is an ABS illustration of FIG. 15.
Figure 16:
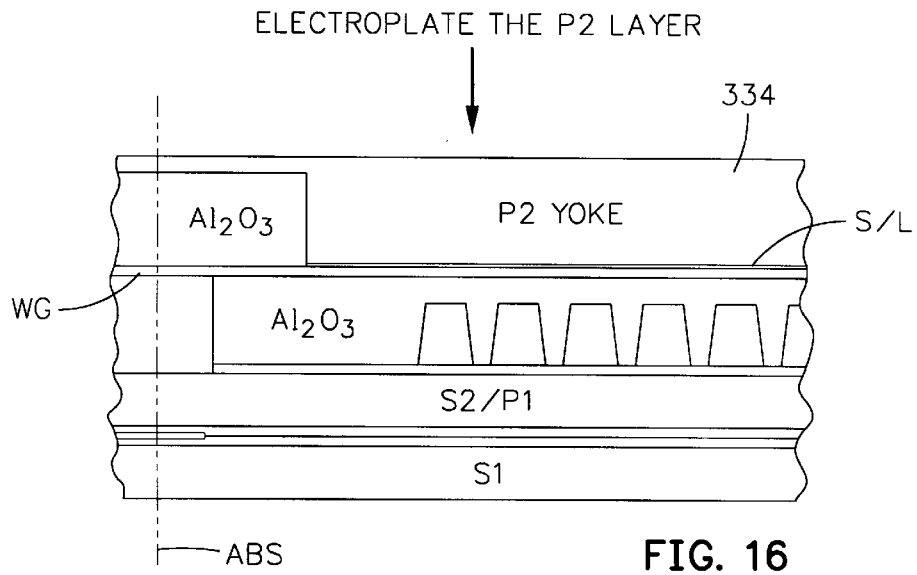
FIG. 16, which is a section 16—16 through FIG. 16A, is the same as FIG. 15 except the P2 tip and the P2 yoke have been simultaneously plated.
Figure 16A:
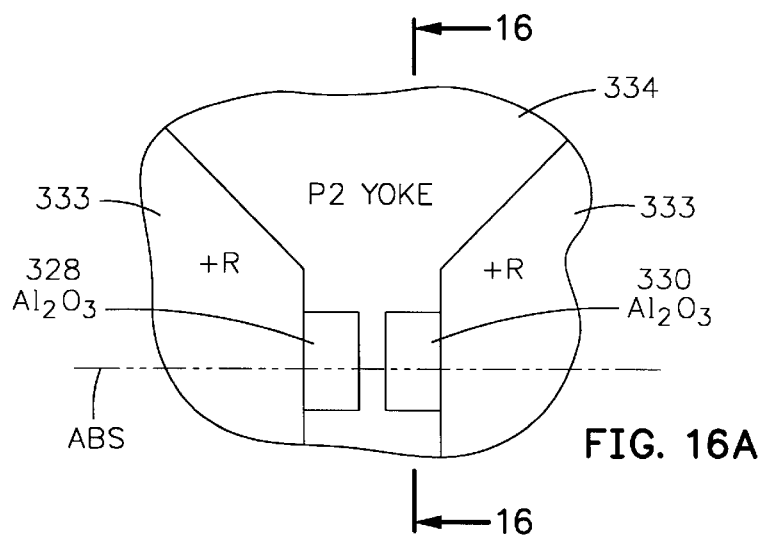
FIG. 16A is a top view of FIG. 16.
Figure 16B:
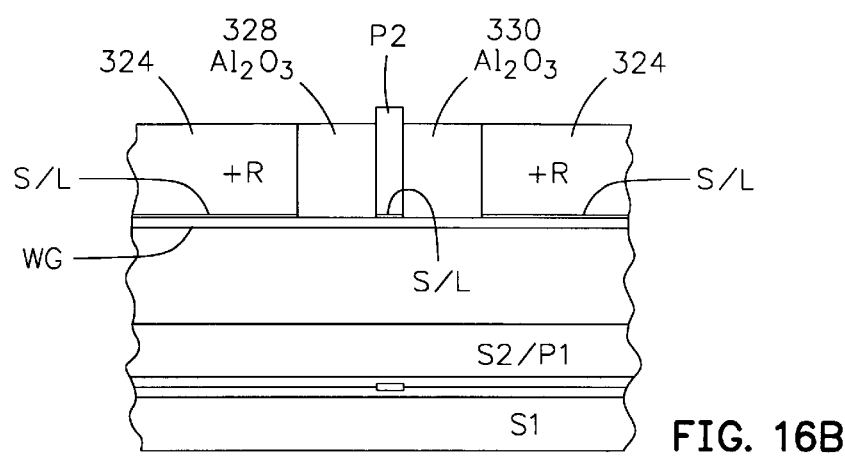
FIG. 16B is an ABS illustration of FIG. 16.

In FIGS. 15, 15A and 15B a positive photoresist frame (+R) 333 is formed for fabricating a second pole piece (P2) yoke, which is discussed hereinafter. The positive photoresist frame 333 has a height which is greater than a desired height of the second pole tip (shown hereafter) and may be as high as the first and second alumina pedestals 328 and 330. As shown in FIGS. 16, 16A and 16B a second pole piece material layer 334 is plated with a height which is greater than the first and second alumina pedestals 328 and 330.

Figure 17:
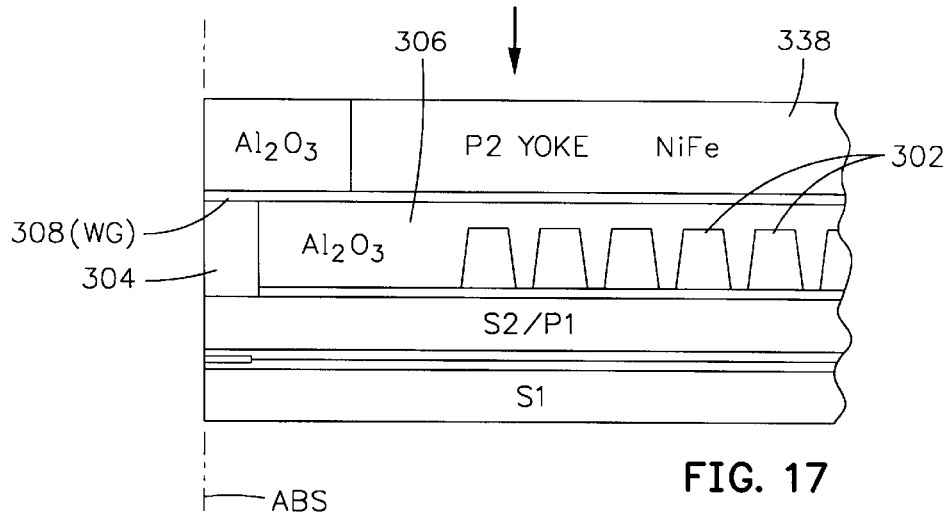
FIG. 17, which is a section 17—17 through FIG. 17A, is the same as FIG. 16 except the P2 tip and the P2 yoke have been chemically mechanically polished until they are planar.
Figure 17A:
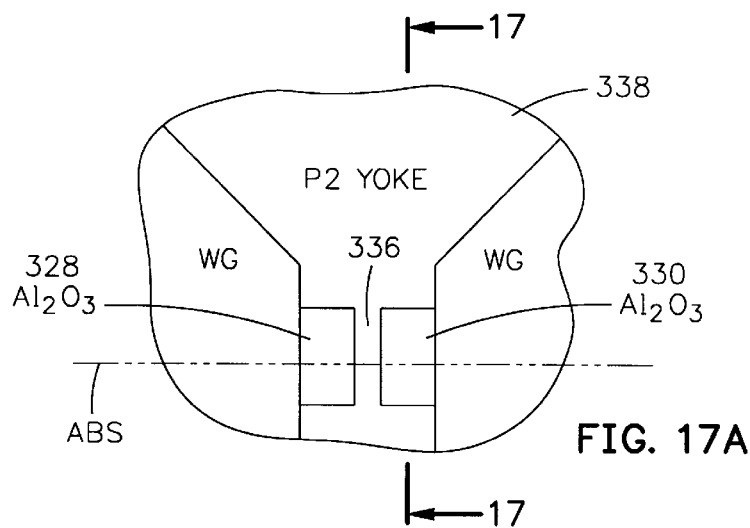
FIG. 17A is a top view of FIG. 17.
Figure 17B:
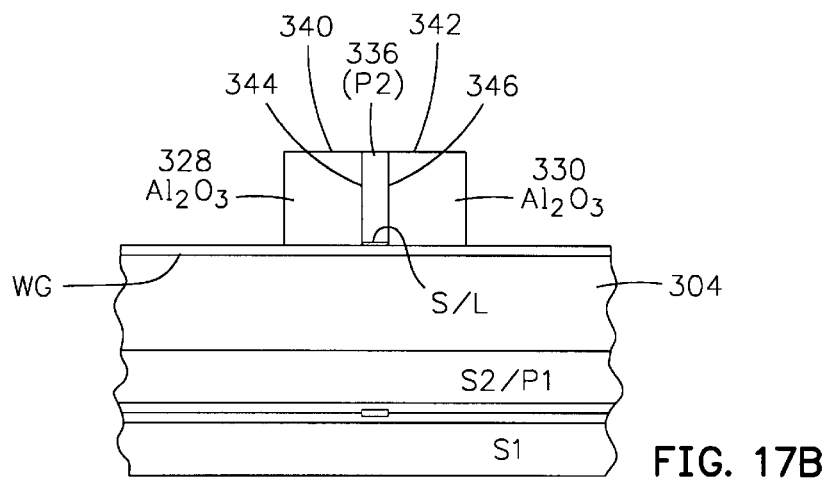
FIG. 17B is an ABS illustration of FIG. 17.

As shown in FIGS. 17, 17A and 17B chemical mechanical polishing is then implemented to polish a second pole tip (P2) 336 to a desired height which also polishes a top of a second pole tip yoke (P2 yoke) 338 and tops 340 and 342 of the first and second alumina pedestals to a common plane with the top of the second pole tip 336. The positive photoresist frame 333, as shown in FIGS. 16A and 16B, may then be removed followed by etching away any plated material and seed layer (S/L) that remains exposed on the wafer. It should be noted in this embodiment that the P2 tip 336 and the P2 yoke 338 are a common layer and have a common top flat surface. This flatness is highly desirable for conduction of the write flux signals to the pole tip. Subsequent processing (not shown) may then be carried out, such as studs for the leads to the sensor and the write coil and an overcoat layer. The wafer is then diced into rows of magnetic heads, each row is lapped to an ABS and each head in the row is then diced into individual heads, as exemplified by FIG. 30.

The invention also includes the article shown in FIGS. 17, 17A and 17B. The pi first and second alumina pedestals 328 and 330 have first and second sides which interface first and second sides 344 and 346 respectively of the P2 tip 336. Further, the tops of the first and second alumina pedestals 328 and 330, the P2 tip 336 and the P2 yoke 338 have a common top flat surface. Further, this embodiment has a P1 pedestal 304 which provides height for the write coil 302 and the alumina insulation 306 so that the P2 tip 336 and the P2 yoke 338 can be maintained flat.

Figure 18:
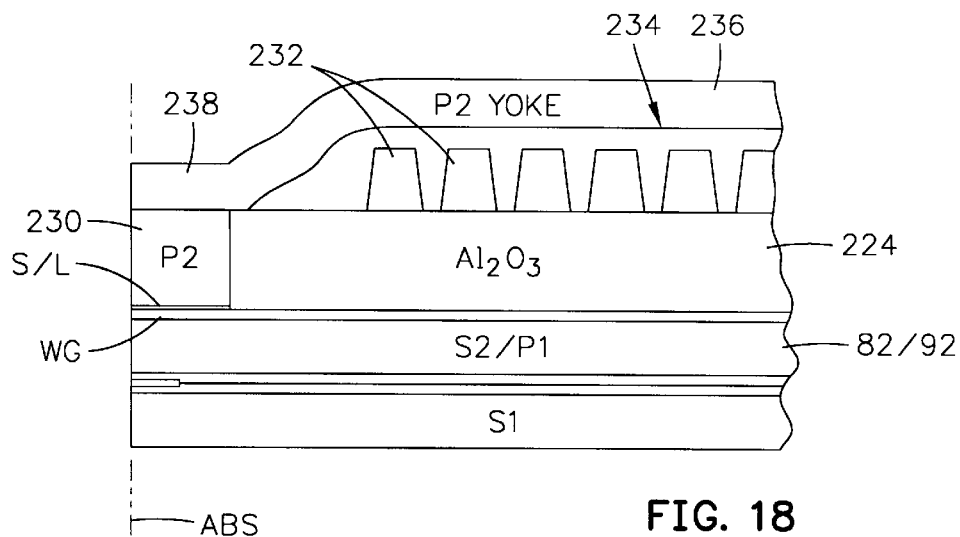
FIG. 18 is a cross—sectional side view of another embodiment of a magnetic head taken along 18—18 of FIG. 18A.
Figure 18A:
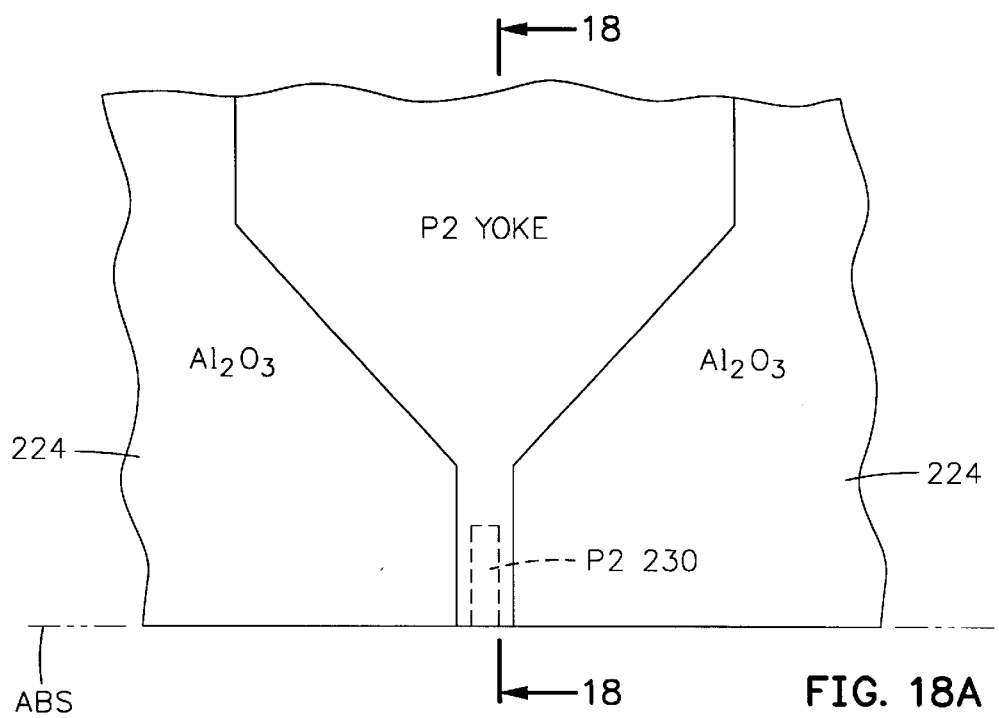
FIG. 18A is a top view of FIG. 18.
Figure 18B:
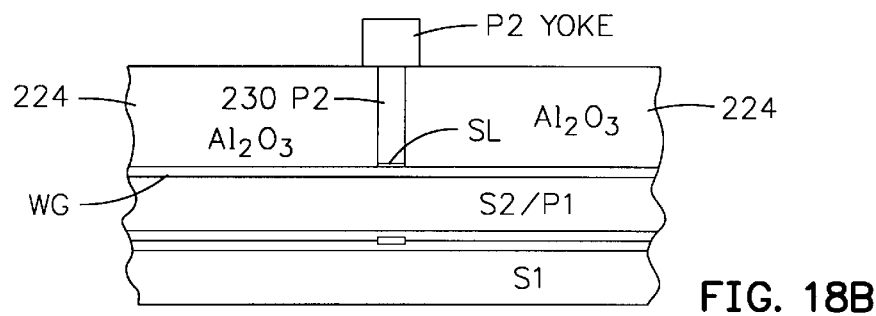
FIG. 18B is an ABS view of FIG. 18.

FIGS. 18, 18A and 18B illustrate another embodiment of the magnetic head wherein the teachings of the invention described for FIGS. 9–17 can be practiced. The major difference in FIG. 18 is that the pedestal 304 in FIG. 9 is not employed.

FIG. 18 shows a P2 tip 230 on a seed layer (S/L) and separated from the S2/P1 layer 82/92 by a write gap (WG). Behind the P2 tip 230 is an alumina layer ($Al_2O_3$) 224 which may be formed by depositing a thick layer of alumina and then CMP until flat with the P2 tip 230. The write coil 232 is formed on the alumina layer 224 and one or more baked photoresist layers 234 may insulate the write coil 232. As shown in FIGS. 18, 18A and 18B a P2 yoke 234 is formed on top of the insulation 234 and has a portion 238 which is stitched to the P2 tip 230.

It should be understood that the $Al_2O_3$ pedestals 328 and 330, shown in FIGS. 17, 17A and 17B, may be employed for forming the P2 tip 230 in FIG. 18.

Figure 19:
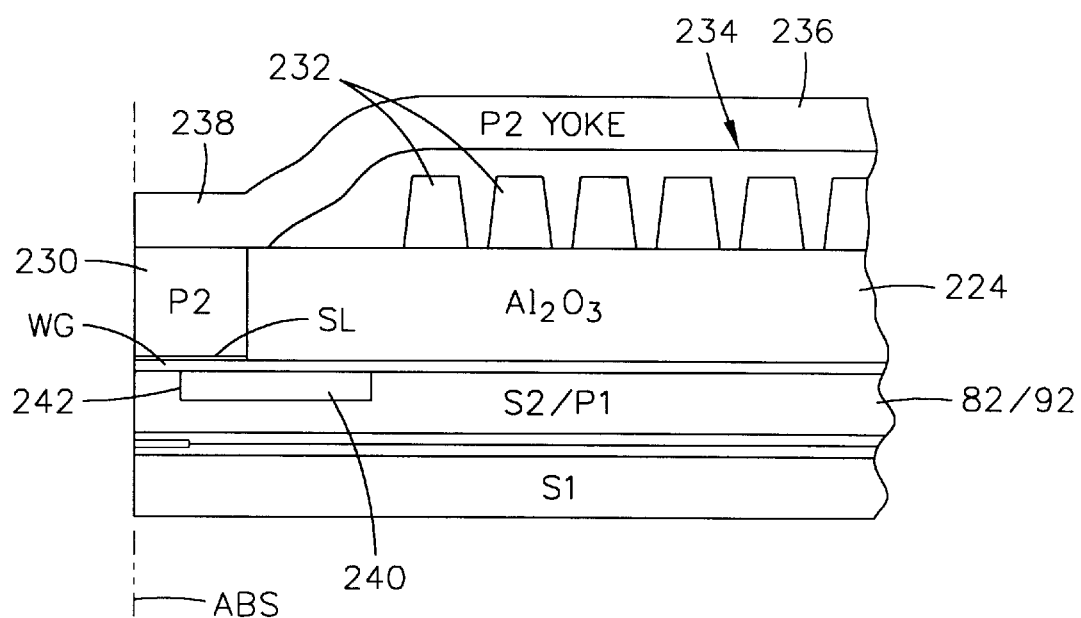
FIG. 19 is the same as FIG. 18 except it has a ZTH defining insulation layer.

FIG. 19 is a modification of FIG. 18 wherein a zero throat height (ZTH) defining insulation layer 240 is inset in the S2/P1 layer 82/92 a short distance from the ABS. The front end 242 of the layer defines the zero throat height where the first and second pole pieces (S2/P1 and P2) first commence to separate after the ABS for minimizing flux leakage.

Discussion

The negative photoresist is known in the art as chemically amplified negative resist and its chemical composition is a combination of a resin, an acid generator, a quencher and a solvent. The type of light employed for exposing the negative photoresist can be line (365 nm) or DUV (248 mn or 193 nm). Chemical mechanical polishing is accomplished by employing small hard particles of $Al_2O_3$, $SiO_2$ or diamond plus a pH component capable of etching the material being lapped (i.e. NaOH for $Al_2O_3$). It should be understood that the metallic layers are formed by plating and that the insulation layers are formed by sputter deposition. It should further be understood that while only one write coil layer is shown in the embodiment that additional write coil layers may be employed.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A method of making a magnetic head that has an air bearing surface (ABS) comprising the steps of:

providing a wafer;

forming a strip of photoresist on the wafer at an ABS site of said ABS with a width that defines a track width of the magnetic head and with a height above a desired height of a second pole tip which is to be formed;

forming a forming layer on the wafer and on the strip with a thickness above the wafer that is equal to or greater than a desired height of the second pole tip which is to be formed;

mechanically polishing the forming layer until the strip is exposed;

removing the strip leaving a second pole tip opening in the forming layer at said site for the second pole tip which is to be formed;

forming the second pole tip which is to be formed in the second pole tip opening; and continuing said mechanical polishing until the second pole tip is at a desired height wherein said desired height is along a height line that lies within a plane of said ABS and is perpendicular to a width line along said track width.

2. A method of making a magnetic head as claimed in claim 1 including the steps of:

before forming said strip of photoresist:

forming a first pole piece layer on the wafer; and forming a nonmagnetic write gap layer on the first pole piece layer;

forming said strip of photoresist on the write gap layer; and ion milling the write gap layer and the first pole piece layer until the first pole piece layer is notched on each side of the strip of photoresist.

3. A method of making a magnetic head as claimed in claim 1 wherein the second pole tip and the second yoke a second pole piece yoke layer are simultaneously formed in a common plane.

4. A method of making a magnetic head that has an air bearing surface (ABS) comprising the steps of:

providing a wafer;

forming a strip of photoresist on the wafer at an ABS site of said ABS with a width that defines a track width of the magnetic head and with a height above a desired height of a second pole tip which is to be formed;

forming a forming layer on the wafer and on the strip with a thickness above the wafer that is equal to or greater than a desired height of the second pole tip which is to be formed;

mechanically polishing the forming layer until the strip is exposed;

removing the strip leaving a second pole tip opening in the forming layer at said site for the second pole tip which is to be formed;

forming the second pole tip which is to be formed in the second pole tip opening;

forming the first photoresist is formed with two openings with a distance therebetween; and said distance being at a location of said strip.

5. A method of making a magnetic head that has an air bearing surface (ABS) comprising the steps of:

providing a wafer;

forming a strip of photoresist on the wafer at an ABS site of said ABS with a width that defines a track width of the magnetic head and with a height above a desired height of a second pole tip which is to be formed;

forming a forming layer on the wafer and on the strip with a thickness above the wafer that is equal to or greater than a desired height of the second pole tip which is to be formed;

mechanically polishing the forming layer until the strip is exposed;

removing the strip leaving a second pole tip opening in the forming layer at said site for the second pole tip which is to be formed;

forming the second pole tip which is to be formed in the second pole tip opening;

before forming the second pole tip, forming a second layer of photoresist on the wafer with an opening in a second pole piece yoke area that defines a second pole piece yoke; and forming said second pole piece yoke in the second pole piece opening simultaneously with forming the second pole tip in said second pole tip opening.

6. A method of making a magnetic head as claimed in claim 5 including second mechanically polishing the second pole tip, the second pole piece yoke, the forming layer and the second photoresist layer until the second pole tip is at a desired height.

7. A method of making a magnetic head as claimed in claim 6 including:

before forming the strip of photoresist and after forming a first pole piece layer:
    forming an insulation stack with at least one coil layer embedded therein on the first pole piece layer;
    depositing a layer of alumina on the entire wafer; and
    mechanically polishing the wafer until the layer of alumina is planar.

8. A method of making a magnetic head as claimed in claim 7 wherein the first pole piece layer has a pedestal at the ABS site with the write gap layer being located between the pedestal and the second pole tip.

9. A method of making a magnetic head as claimed in claim 8 wherein said forming of the strip of photoresist comprises the steps of:

forming a layer of negative photoresist on the wafer;
light imaging the layer of negative photoresist to define said strip; and
developing the layer of negative photoresist to provide said strip.

10. A method of making a magnetic head as claimed in claim 9 wherein:

the first photoresist is formed with two openings with a distance therebetween; and
said distance being at a location of said strip.

11. A method of making a magnetic head as claimed in claim 10 including the steps of:

before forming said strip of photoresist:
    forming the first pole piece layer on the wafer; and
    forming a nonmagnetic write gap layer on the first pole piece layer;
forming said strip of photoresist on the write gap layer; and
ion milling the write gap layer and the first pole piece layer until the first pole piece layer is notched on each side of the strip of photoresist.

12. A method of making a magnetic head as claimed in claim 11 including:

after forming the write gap layer, forming a seed layer on the write gap layer; and
said forming of the second pole tip and the second pole piece yoke consisting of simultaneously plating the second pole tip and the second pole piece yoke.

13. A method of making a magnetic head as claimed in claim 12 wherein the second layer of photoresist is a second layer of positive photoresist.

14. A method of making a magnetic head as claimed in claim 13 wherein the strip is removed by oxygen based reactive ion etching.

15. A method of making a magnetic head as claimed in claim 14 wherein the forming layer is alumina.

16. A method of making a magnetic head as claimed in claim 15 including:

before forming the first pole piece layer:
    forming a ferromagnetic first shield layer on the wafer;
    forming a nonmagnetic electrically insulative first read gap layer on the first shield layer;
    forming a sensor and first and second hard bias and lead layers connected to the sensor on the first read gap layer; and
    forming a nonmagnetic electrically insulative second read gap layer on the sensor and the first and second hard bias and lead layers.

17. A method of making a magnetic head as claimed in claim 16 including:

forming the first pole piece layer directly on the second read gap layer.

* * * * *